US012578513B2

(12) United States Patent
Lambert et al.

(10) Patent No.: US 12,578,513 B2
(45) Date of Patent: Mar. 17, 2026

(54) DIFFUSER TO IMPROVE UNIFORMITY OF HEAD-UP DISPLAY IMAGE BRIGHTNESS

(71) Applicant: Panasonic Automotive Systems America, LLC., Peachtree City, GA (US)

(72) Inventors: David Kay Lambert, Sterling Heights, MI (US); Marc Lata, Atlanta, GA (US); Fidelis Itsede, Acworth, GA (US); Benjamin Lewis, Livonia, MI (US)

(73) Assignee: Panasonic Automotive Systems America, LLC., Peachtree City, GA (US)

( * ) Notice: Subject to any disclaimer, the term of this patent is extended or adjusted under 35 U.S.C. 154(b) by 0 days.

(21) Appl. No.: 18/507,294

(22) Filed: Nov. 13, 2023

(65) Prior Publication Data

US 2024/0176051 A1      May 30, 2024

Related U.S. Application Data

(60) Provisional application No. 63/428,871, filed on Nov. 30, 2022.

(51) Int. Cl.
| | |
|---|---|
| G02B 5/02 | (2006.01) |
| B60K 35/23 | (2024.01) |
| G02B 27/01 | (2006.01) |

(52) U.S. Cl.
CPC ............ G02B 5/0221 (2013.01); B60K 35/23 (2024.01); G02B 27/0101 (2013.01); B60K

2360/25 (2024.01); *B60K 2360/31* (2024.01); *B60K 2360/349* (2024.01); *G02B 2027/0118* (2013.01)

(58) Field of Classification Search
CPC ................. B60Q 2400/50; B60Q 3/18; B60Q 2300/112; B60Q 1/503; G02B 5/02; G02B 27/01; B60K 35/23
See application file for complete search history.

(56) References Cited

U.S. PATENT DOCUMENTS

| | | | | |
|---|---|---|---|---|
| 6,043,937 | A * | 3/2000 | Hudson .............. | G02B 27/0101 |
| | | | | 362/494 |
| 6,550,949 | B1 * | 4/2003 | Bauer .................. | B60Q 1/0023 |
| | | | | 362/800 |
| 6,750,832 | B1 * | 6/2004 | Kleinschmidt ........ | G02B 27/01 |
| | | | | 345/9 |
| 7,095,562 | B1 * | 8/2006 | Peng .................. | G02B 27/0101 |
| | | | | 359/290 |
| 7,423,522 | B2 * | 9/2008 | O'Brien ................ | G01S 13/865 |
| | | | | 701/484 |

(Continued)

*Primary Examiner* — William J Carter
(74) *Attorney, Agent, or Firm* — Laurence S. Roach, Esq.

(57)      ABSTRACT

A backlighting arrangement is for a head up display that presents a virtual image to a human driver of a motor vehicle. The arrangement includes a light source emitting light with a non-uniform brightness over a field of view of the human driver. A diffuser includes a surface through which the light emitted by the light source passes. The surface has a texture that varies with position on the surface. The texture scatters the light such that the brightness of the light over a field of view of the human driver is more uniform after passing through the diffuser at a given average brightness than it would be with a diffuser configured to scatter light independent of position after passing through the diffuser.

6 Claims, 5 Drawing Sheets

(56)        References Cited

U.S. PATENT DOCUMENTS

| | | | | | |
|---|---|---|---|---|---|
| 7,729,578 | B2 * | 6/2010 | Alasaarela | ............. | F21V 5/046 |
| | | | | | 385/33 |
| 2003/0007363 | A1 * | 1/2003 | Yagi | ........................ | B60Q 1/14 |
| | | | | | 362/509 |
| 2006/0291243 | A1 * | 12/2006 | Niioka | ................ | F21V 33/0052 |
| | | | | | 362/606 |
| 2008/0319715 | A1 * | 12/2008 | Kim | ..................... | G02B 6/0025 |
| | | | | | 703/1 |
| 2011/0075434 | A1 * | 3/2011 | Kurokawa | ......... | G02B 27/0101 |
| | | | | | 362/237 |
| 2012/0300486 | A1 * | 11/2012 | Matsushita | ........... | B60K 35/00 |
| | | | | | 362/543 |
| 2012/0320621 | A1 * | 12/2012 | Kleo | ................... | B32B 17/1066 |
| | | | | | 362/558 |
| 2014/0204601 | A1 * | 7/2014 | Bauerle | .................. | B60Q 3/208 |
| | | | | | 29/428 |
| 2014/0285997 | A1 * | 9/2014 | Nitta | ......................... | F21K 9/64 |
| | | | | | 252/301.4 F |
| 2015/0009695 | A1 * | 1/2015 | Christmas | ............. | F21S 41/645 |
| | | | | | 362/466 |
| 2015/0184830 | A1 * | 7/2015 | Nagao | ...................... | F21V 9/45 |
| | | | | | 362/583 |
| 2015/0291880 | A1 * | 10/2015 | Okuyama | .......... | G02B 27/0101 |
| | | | | | 252/301.4 F |
| 2023/0107281 | A1 * | 4/2023 | Levi | ...................... | B60Q 1/143 |
| | | | | | 362/466 |
| 2023/0113959 | A1 * | 4/2023 | Erler | ...................... | G03H 1/22 |
| | | | | | 362/509 |
| 2023/0228396 | A1 * | 7/2023 | Okahisa | ................ | F21S 41/153 |
| | | | | | 362/520 |

* cited by examiner

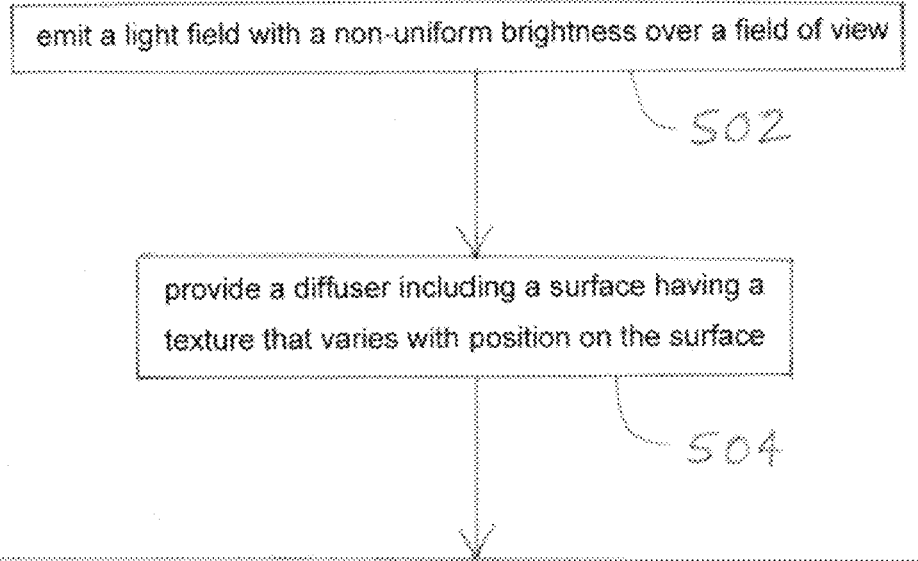

emit a light field with a non-uniform brightness over a field of view

502 provide a diffuser including a surface having a texture that varies with position on the surface

504 place the diffuser in a path of the light field such that the varying texture of the diffuser surface scatters the light, and such that for a virtual image intended to have constant brightness the brightness of the light over the field of view as seen by the human driver is more uniform at a given brightness than with a diffuser configured to scatter light independent of position

506

DIFFUSER TO IMPROVE UNIFORMITY OF HEAD-UP DISPLAY IMAGE BRIGHTNESS

CROSS-REFERENCED TO RELATED APPLICATIONS

This application claims benefit of U.S. Provisional Application No. 63/428,871, filed on Nov. 30, 2022, the disclosure of which is hereby incorporated by reference in its entirety for all purposes.

BACKGROUND OF THE INVENTION

1. Field of the Invention

The present invention relates to a head up display (HUD) of a motor vehicle.

2. Description of the Related Art

A head up display emits light that reflects from the front windshield to be seen by the driver. The light appears to come from a virtual image in front of the driver and in front of the windshield. This type of head up display is currently commercially available.

Conventional head up displays create the virtual image by first using a display or picture generation unit to create an image. Next, the light from the image is reflected from one or more mirrors. Next, the light from the mirrors is directed up to the windshield and is then reflected from the windshield towards the driver. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

A driver in a vehicle with a head-up display expects the entire virtual image to appear uniform in brightness if the virtual image is intended to have constant brightness. Automakers have a corresponding target for brightness uniformity that a head-up display should meet. A problem is that brightness tends to be greater in the center of the virtual image because the center of the virtual image tends to be closer to light sources and/or receives light from a greater number of light sources.

In the optical design of a head-up display there are two competing objectives. The first is for the average brightness of the virtual image as seen by the driver to be as large as possible for a given light output from the source. The second is for the brightness of the virtual image as seen by the driver to be as uniform as possible.

One approach that has been used previously is to distribute the LEDs in the backlight for the liquid crystal display (LCD) for a head-up display as a two-dimensional array, and to adjust the current through the individual LEDs to optimize uniformity as seen by the driver. This approach, known as local dimming, adds complexity and cost to the head-up display.

Other known methods to improve luminance uniformity of the virtual image include the use of one or more sheets of diffuser material, with there being uniform optical diffusion characteristics over the surface of the diffuser. It is also known to use bulk optical elements such as lenses, reflectors, and baffles.

SUMMARY OF THE INVENTION

The invention may provide a method to improve the uniformity of the luminance of the virtual image of an automotive head-up display as seen by the driver of a vehicle. The method may use a diffuser with at least one local scattering property that varies as a function of position on the diffuser. The present invention enables brightness uniformity to be increased without the need to use a two-dimensional array of LEDs.

The invention comprises, in one form thereof, a backlighting arrangement for a head up display that presents a virtual image to a human driver of a motor vehicle. The arrangement includes a light source emitting light with a non-uniform brightness within the field of view of the head-up display as seen by the human driver. A diffuser includes a surface through which the light emitted by the light source passes. The surface has a texture that varies with position on the surface. The texture scatters the light such that the brightness of the light over the field of view of the head-up display as seen by the human driver is more uniform at a given average brightness of the light source with the variable diffuser than it would be for any diffuser with texture that does not vary as a function of position.

The invention comprises, in another form thereof, a method for providing backlighting for a head up display of a motor vehicle, including emitting a light field with a non-uniform brightness over a field of view. A diffuser is provided including a surface having a texture that varies with position on the surface. The diffuser is placed in a path of the light field such that the varying texture of the diffuser surface scatters the light, and such that for a virtual image intended to have constant brightness, the brightness uniformity over the field of view of the head-up display as seen by the driver, is more uniform with the variable diffuser than it would be for any diffuser with texture that does not vary as a function of position.

The invention comprises, in yet another form thereof, a backlighting arrangement for a head up display that presents a virtual image to a human driver of a motor vehicle. The arrangement includes a light source emitting light with a non-uniform brightness over a field of view of a head-up display as seen by the human driver. A diffuser includes a first surface through which the light emitted by the light source passes. The first surface has a texture that varies with position on the surface. The diffuser includes a second surface through which the light emitted by the light source passes. The second surface has a plurality of micro-prisms that vary with position on the surface. The texture and the micro-prisms scatter the light such that the brightness of the light over a field of view of the head-up display as seen by a human driver is more uniform after passing through the diffuser than before passing through the diffuser, for a virtual image intended to have constant brightness, for a given average brightness of the light source.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 5 is a flow chart of one embodiment of method of the present invention for providing backlighting for a head up display of a motor vehicle.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
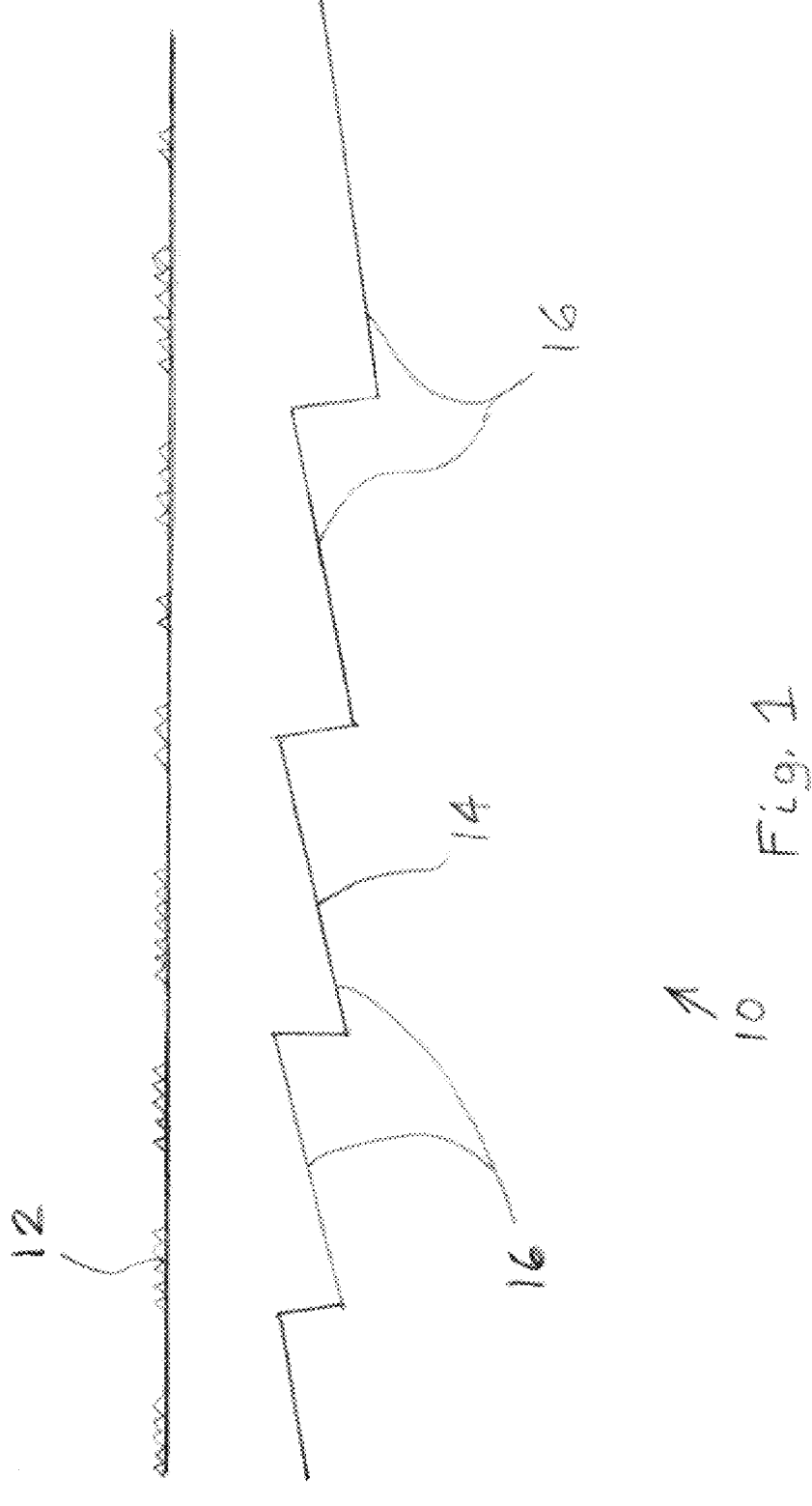
FIG. 1 is a fragmentary cross-sectional view of one embodiment of a diffuser of the present invention.

FIG. 1 illustrates one embodiment of a diffuser 10 of the present invention having two outer surfaces 12 and 14. Surface 12 has a texture that varies as a function of position to control the scattering of visible light as a function of position. For example, surface 12 may have smooth sections that scatter light to a lesser degree, and rough or undulating sections that scatter light to a greater degree.

The other surface 14 is covered with micro-prisms 16 that vary as a function of position to control the bend angle of light passing through the surface as a function of position. Each micro-prism 16 may have a width and length of approximately between three and 100 microns, and the maximum height of a micro-prism is less than half of the maximum width and length.

Diffuser 10 is conceptually divided into small facets. Within each facet, the light incident on diffuser 10 is directed in a respective predetermined direction by a respective one of prisms 16 as in a Fresnel lens. Prisms 16 are directed so that the bend angle varies with position. The light is also scattered by the surface texture applied at that facet, as the surface is textured so that scattering varies with position.

The variables of direction and scattering on the entire surfaces 12, 14 may be optimized. As a result, the light from the backlight is directed to obtain a more even distribution of light, as seen by the driver.

Figure 2:
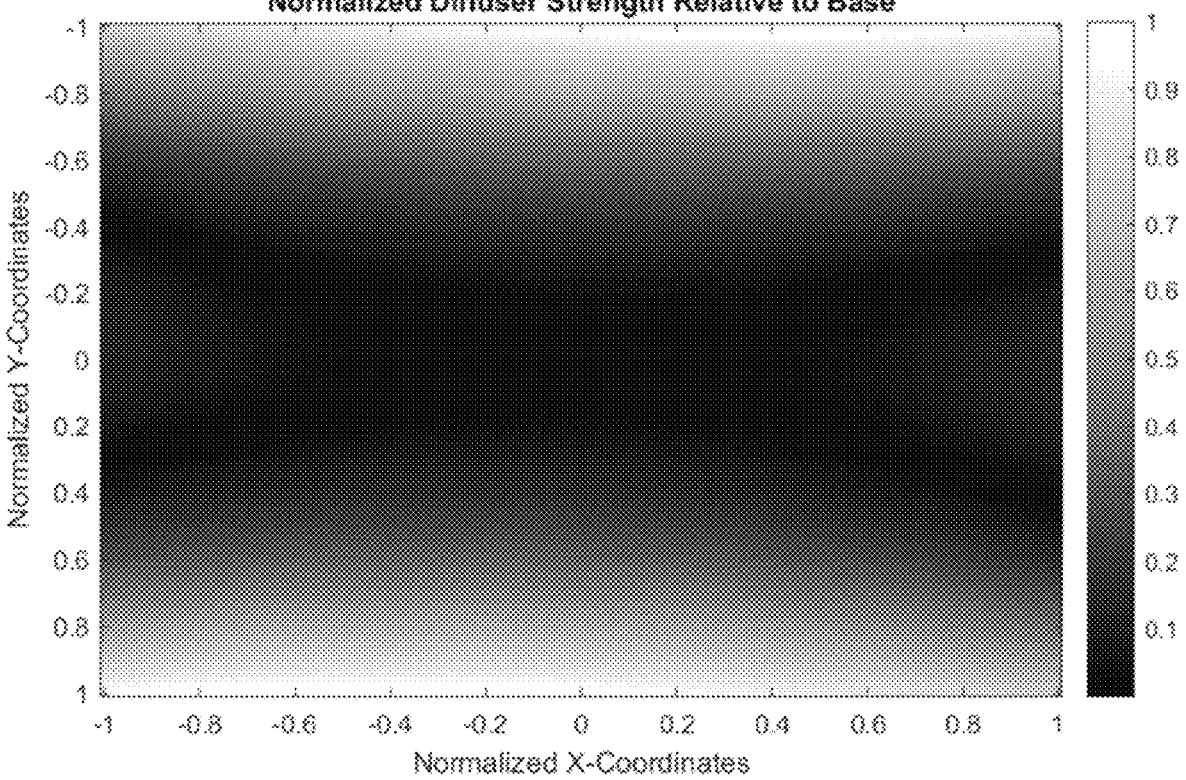
FIG. 2 is an example plot of a diffuser of FIG. 1 with diffuser strength that varies as a function of position on the diffuser to optimize the uniformity of the brightness of the virtual image.

FIG. 2 illustrates an example of an optimized diffuser of FIG. 1. The diffuser has at least one scattering parameter that varies as a function of position on the diffuser. As a specific embodiment, the diffuser is fabricated beginning with a featureless plastic film of an appropriate size to cover the back surface of a liquid crystal display. Both the front and back surface of the film is embossed with a mold. The surface of the mold is composed of a pattern of microstructures of the appropriate dimensions to scatter and direct visible light.

In the example shown in FIG. 2, only the distribution of scattering properties on the diffuser has been optimized as a function of position. In this example, the scattering as a function of position is optimized by modeling the film as a gradient diffuser in the LightTools program provided by Synopsys Inc.

The microstructures are defined using one or more variable parameters that determine the scattering distribution of light that interacts with that local area. The mold is designed so the microstructures vary as a function of position on the surface of the mold, so the light scattering, and direction change of light passing through the film varies as intended, as a function of position.

Figure 3:
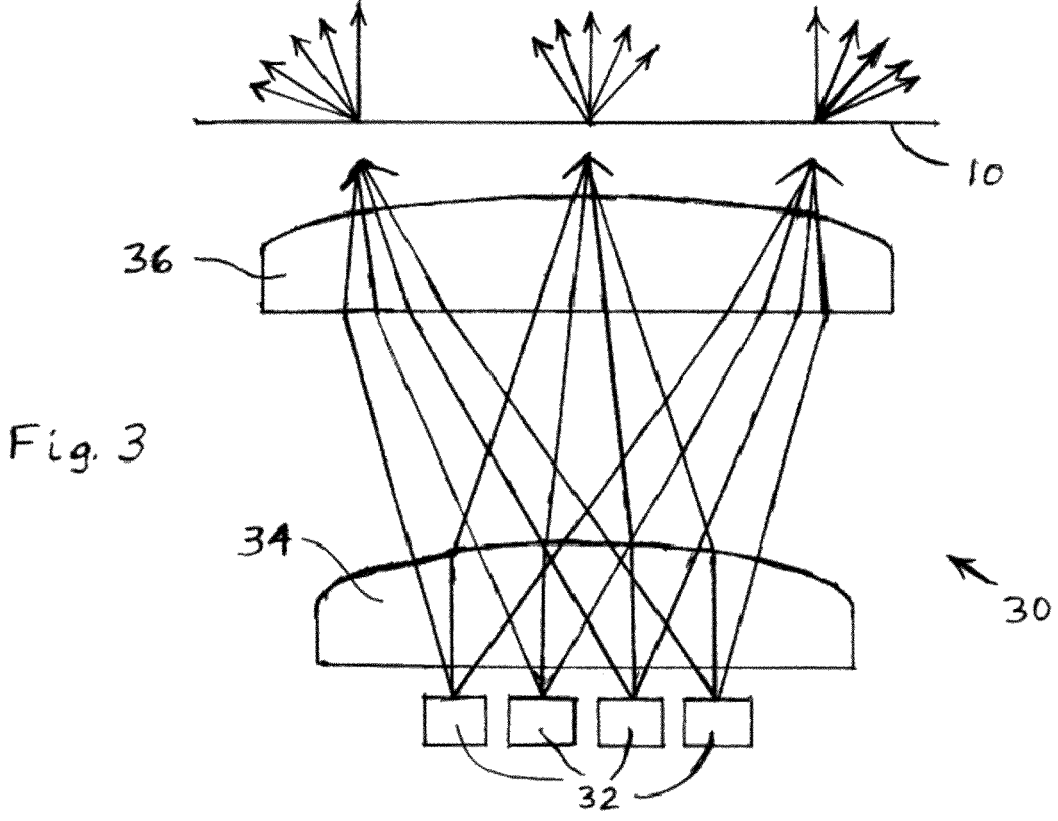
FIG. 3 is a front schematic view of one embodiment of a head up display LCD backlighting arrangement of the invention including the diffuser of FIG. 1.
Figure 4:
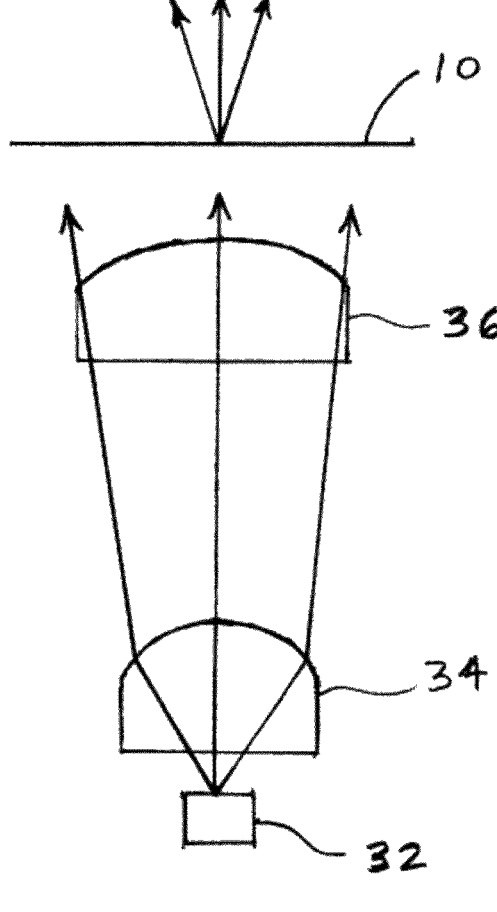
FIG. 4 is a side schematic view of the head up display LCD backlighting arrangement of FIG. 3.

FIGS. 3-4 present a front view and side view, respectively, of a head up display LCD backlighting arrangement 30 according to one embodiment of the invention, including diffuser 10 of FIG. 1. Arrangement 30 also includes light emitting diodes (LEDs) 32 and free form lenses 34, 36. Although four LEDs 32 are shown in FIG. 3 for ease of illustration, there may be about ten LEDs. As shown, diffuser 10 has a relatively small diffusion angle.

The texture of surface 12 and the configurations of prisms 16 may be such that luminance is moved from the center of the field of view to the corners of the field of view. For example, light initially directed to the central portion of the field of view may undergo a higher level of scattering to thereby move more of the light to the outer periphery of the field of view.

In an alternative embodiment (not shown), the diffuser surface includes sub-areas of at least two types of texture. The diffuser is positioned far enough away from the display so variation in the scattering in a sub-area does not cause unwanted structure at the surface of the display. The fraction of at least one type of texture varies as a function of position on the diffuser.

In yet another embodiment, the scattering texture is provided on the surface of a lens, such as on the surface of at least one of lenses 34, 36, rather than on the surface of the diffuser.

In still another embodiment, a reflective diffuser is used with scattering and reflection directions that vary as a function of position on the diffuser.

FIG. 5 illustrates one embodiment of method 500 of the present invention for providing backlighting for a head up display of a motor vehicle. In a first step 502, a light field with a non-uniform brightness is emitted over a field of view. For example, light emitting diodes (LEDs) 32 may conjunctively emit a light field with a brightness that varies depending on the position within a field of view of a human driver of the motor vehicle.

Next, in step 504, a diffuser is provided including a surface having a texture that varies with position on the surface. For example, diffuser 10 has an outer surface 12 with a texture that varies as a function of position.

In a final step 506, the diffuser is placed in a path of the light field such that the varying texture of the diffuser surface scatters the light, and such that for a virtual image intended to have constant brightness the brightness of the light over the field of view as seen by the human driver is more uniform at a given brightness than with a diffuser configured to scatter light independent of position. For example, diffuser 10 is placed in a path of the light field such that the varying texture of the diffuser surface 12 scatters the light. For a virtual image that is intended to have constant brightness over the field of view of a viewer, the brightness of the light over the field of view as seen by the human driver is more uniform at a given brightness of LEDs 32 than the brightness of the light over the field of view as seen by the human driver would be with a diffuser that scatters light independent of position. Thus, the light-scattering provided by the varying diffuser surface 12 increases the uniformity of brightness as seen by the driver.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A backlighting arrangement for a head-up display that presents a virtual image to a human driver of a motor vehicle, the arrangement comprising: a light source configured to emit light with a non-uniform brightness over a field of view of the human driver and a diffuser including a surface through which the light emitted by the light source passes, the surface having a texture that varies with position on the surface, the texture being configured to scatter the light, wherein the texture of the surface of the diffuser is configured to scatter the light such that for a virtual image intended to have uniform brightness, the brightness of the virtual image as seen by the human driver is more uniform at a given said non-uniform brightness of the light source.

2. The arrangement of claim 1 wherein the diffuser is configured to scatter light dependent on the position on the surface of the diffuser, the texture of the surface of the diffuser being configured to scatter the light such that for a virtual image intended to have uniform brightness, the brightness of the virtual image as seen by the human driver is more uniform at a given said non-uniform brightness of the light source than if the diffuser were configured to scatter light independent of position on the surface of the diffuser.

3. A method for providing backlighting for a head up display of a motor vehicle, the method comprising: emitting a light field with a non-uniform brightness over a field of view; providing a diffuser including a surface having a texture that varies with position on the surface; and placing the diffuser in a path of the light field such that the varying texture of the diffuser surface scatters the light, wherein the diffuser is placed in a path of the light field such that, for a virtual image intended to have constant brightness, the brightness of the light over the field of view as seen by the human driver is more uniform at a non-uniform brightness over the field of view.

4. The method of claim 3 wherein the diffuser is configured to scatter light dependent on position on the surface of the diffuser, the diffuser being placed in a path of the light field such that, for a virtual image intended to have constant brightness, the brightness of the light over the field of view as seen by the human driver is more uniform than it would be if the diffuser were configured to scatter light independent of position on the surface of the diffuser.

5. A backlighting arrangement for a head up display that presents a virtual image to a human driver of a motor vehicle, the arrangement comprising: a light source configured to emit light with anon-uniform brightness over a field of view of the human driver; and a diffuser including: a first surface through which the light emitted by the light source passes, the first surface having a texture that varies with position on the first surface; and a second surface through which the light emitted by the light source passes, the second surface having a plurality of micro-prisms that vary with position on the second surface, the texture and the micro-prisms being configured to scatter the light, wherein the texture and the micro-prisms are configured to scatter the light such that the brightness of the light over a field of view of the human driver is more uniform at a given said non-uniform brightness of the light source.

6. The arrangement of claim 5 wherein the diffuser is configured to scatter light dependent on positions on the first surface and the second surface through which the light emitted by the light source passes, the texture and the micro-prisms being configured to scatter the light such that the brightness of the light over a field of view of the human driver is more uniform at a given said non-uniform brightness of the light source than with a diffuser configured to scatter light independent of positions on the first surface and the second surface through which the light emitted by the light source passes.

* * * * *